United States Patent
Yuan et al.

(10) Patent No.: US 11,913,590 B2
(45) Date of Patent: Feb. 27, 2024

(54) FLEXIBLE PERISTALTIC ROBOT WITH BUILT-IN BIDIRECTIONAL GAS PUMP FOR SELF-REGULATING GAS FLOW

(71) Applicant: PEKING UNIVERSITY SCHOOL OF STOMATOLOGY, Beijing (CN)

(72) Inventors: Fusong Yuan, Beijing (CN); Peijun Lyu, Beijing (CN); Yunsong Liu, Beijing (CN); ShanShan Liang, Beijing (CN)

(73) Assignee: PEKING UNIVERSITY SCHOOL OF STOMATOLOGY, Beijing (CN)

( * ) Notice: Subject to any disclaimer, the term of this patent is extended or adjusted under 35 U.S.C. 154(b) by 380 days.

(21) Appl. No.: 17/315,264

(22) Filed: May 7, 2021

(65) Prior Publication Data
US 2021/0260752 A1   Aug. 26, 2021

Related U.S. Application Data

(63) Continuation of application No. PCT/CN2019/103912, filed on Sep. 2, 2019.

(30) Foreign Application Priority Data

Jul. 18, 2019 (CN) .......................... 201910652241.7

(51) Int. Cl.
*F16L 55/34*    (2006.01)
*F04B 43/08*    (2006.01)

(52) U.S. Cl.
CPC ............... *F16L 55/34* (2013.01); *F04B 43/08* (2013.01)

(58) Field of Classification Search
CPC .................................. F16L 55/34; F04B 43/08
See application file for complete search history.

(56) References Cited

U.S. PATENT DOCUMENTS

| | | | |
|---|---|---|---|
| 6,939,291 B2* | 9/2005 | Phee Soo Jay | A61B 1/015 600/114 |
| 9,061,118 B2* | 6/2015 | Shoham | A61M 25/0116 |
| 2013/0216400 A1 | 8/2013 | Bucher et al. | |

FOREIGN PATENT DOCUMENTS

| | | | |
|---|---|---|---|
| CN | 201133548 Y | * | 10/2008 |
| CN | 101430038 A | | 5/2009 |

(Continued)

OTHER PUBLICATIONS

English Machine Translation of description of CN-104523215-A (Year: 2015).*

(Continued)

*Primary Examiner* — Nathan C Zollinger

(57) ABSTRACT

A flexible peristaltic robot with a built-in bidirectional gas pump for self-regulating gas flow. The robot includes a head-end airbag, an extension-retraction airbag, a tail-end airbag, a power module, a control module and a bidirectional gas pump. When there is harmful gas or less gas in the external environment, an additional airbag is provided in the flexible peristaltic robot to form a closed internal circulation of air flow. Otherwise, the robot directly exchanges gas with the external environment to form an open external circulation of air flow. The flexible peristaltic robot can either use multiple bidirectional air pumps or use a single bidirectional air pump and multiple electrically-controlled switches to control the expansion and contraction of the airbags to enable the robot to move forward.

7 Claims, 4 Drawing Sheets

(56) References Cited

FOREIGN PATENT DOCUMENTS

| CN | 101480794 | A | | 7/2009 | | |
|----|-----------|---|---|--------|---|---|
| CN | 101669809 | A | | 3/2010 | | |
| CN | 103070659 | A | | 5/2013 | | |
| CN | 104523215 | A | * | 4/2015 | ......... | A61B 1/00006 |
| CN | 104523215 | A | | 4/2015 | | |
| CN | 208759572 | U | | 4/2019 | | |
| CN | 109899622 | A | | 6/2019 | | |
| CN | 109945013 | A | | 6/2019 | | |
| CN | 108430301 | B | * | 1/2022 | ......... | A61B 17/0218 |
| JP | 2002000551 | A | | 1/2002 | | |
| JP | 2006212220 | A | | 8/2006 | | |

OTHER PUBLICATIONS

English Machine Translation of description of CN-201133548-Y (Year: 2008).*
English Machine Translation of description of CN-108430301-B (Year: 2022).*

\* cited by examiner

FLEXIBLE PERISTALTIC ROBOT WITH BUILT-IN BIDIRECTIONAL GAS PUMP FOR SELF-REGULATING GAS FLOW

CROSS-REFERENCE TO RELATED APPLICATIONS

This application is a continuation of International Application No. PCT/CN2019/103912, filed on Sep. 2, 2019, which claims the benefit of priority from Chinese Patent Application No. 201910652241.7, filed on Jul. 18, 2019. The content of the aforementioned applications, including any intervening amendments thereto, are incorporated herein by reference.

TECHNICAL FIELD

This application relates to a robot, and more particularly to a flexible peristaltic robot with a built-in bidirectional gas pump for self-regulating gas flow.

BACKGROUND

A pipeline robot is a machine that can walk along an inner wall of the pipeline, and it can carry various detecting instruments and working devices to perform detection and processing under the remote control of the operator or autonomous control. In the prior art, a Chinese Patent Application No. 200810106352.X disclosed a flexible peristaltic pipeline robot, which is less adaptable to diameter-varying pipelines.

An airbag-type peristaltic robot with an external air pump has been designed to improve the adaptability to diameter-varying pipelines. The robot uses the external air pump to inflate the airbag, such that the airbag self-adaptively fits the diameter-varying pipelines to improve the adaptability to the diameter-varying pipelines. However, it has been further found that the airbag-type peristaltic robot with the external air pump still has the following defect. Specifically, the external air pump is connected to the airbag-type peristaltic robot by an air pipeline, which will limit the movement and flexibility of the robot.

SUMMARY

An object of this application is to provide a flexible peristaltic robot with a built-in bidirectional gas pump for self-regulating gas flow to solve the problem of low flexibility of an airbag-type peristaltic robot in the prior art.

Technical solutions of this application are described as follows.

This application provides a flexible peristaltic robot with a built-in bidirectional gas pump for self-regulating gas flow, comprising:
 a head-end airbag;
 an extension-retraction airbag;
 a tail-end airbag;
 a power module;
 a control module; and
 a bidirectional gas pump;
 wherein the power module is configured to supply power to the bidirectional gas pump and the control module;
 the head-end airbag, the extension-retraction airbag and the tail-end airbag are connected in sequence along an axial direction; and
 the control module is configured to control the bidirectional gas pump to inflate and deflate the head-end airbag, the extension-retraction airbag and the tail-end airbag, such that the head-end airbag and the tail-end airbag are expanded or contracted along a radial direction, and the extension-retraction airbag is extended or retracted along the axial direction.

In an embodiment, the flexible peristaltic robot does not need an external gas source, and gases supplied and discharged by the bidirectional gas pump flow inside the flexible peristaltic robot; or the bidirectional gas pump is connected to external environment to perform gas exchange between the head-end airbag, the extension-retraction airbag and the tail-end airbag inside the robot and the external environment.

In an embodiment, the flexible peristaltic robot further comprises an additional airbag; and the additional airbag is configured to store gas.

In an embodiment, the robot further comprises a mounting platform; the mounting platform is provided at a connection between the head-end airbag and the extension-retraction airbag or at a connection between the tail-end airbag and the extension-retraction airbag; or the connection between the head-end airbag and the extension-retraction airbag and the connection between the tail-end airbag and the extension-retraction airbag are provided with the mounting platform, respectively.

In an embodiment, the bidirectional gas pump, the power module and the control module are provided on the mounting platform.

In an embodiment, the mounting platform comprises a first flange and a second flange matched with each other; the first flange is connected sealedly with the second flange; and the first flange is connected to the extension-retraction airbag, and the second flange is connected to the head-end airbag and/or the tail-end airbag.

In an embodiment, the number of the bidirectional gas pump is one; the flexible peristaltic robot further comprises a plurality of channels and an electrically-controlled switch; the head-end airbag, the tail-end airbag and the extension-retraction airbag are connected to one air pipe of the bidirectional gas pump through the plurality of channels, respectively; each of the plurality of channels is provided with the electrically-controlled switch; and the other air pipe of the bidirectional gas pump is connected to the additional airbag or the external environment.

In an embodiment, the bidirectional gas pump comprises a first bidirectional gas pump, a second bidirectional gas pump and a third bidirectional gas pump;
 two air pipes of the first bidirectional gas pump are connected to the additional airbag and the head-end airbag, respectively; two air pipes of the second bidirectional gas pump are connected to the additional airbag and the tail-end airbag, respectively; and two air pipes of the third bidirectional gas pump are connected to the additional airbag and the extension-retraction airbag, respectively; or
 the two air pipes of the first bidirectional gas pump are connected to the external environment and the head-end airbag, respectively; the two air pipes of the second bidirectional gas pump are connected to the external environment and the tail-end airbag, respectively; and the two air pipes of the third bidirectional gas pump are connected to the external environment and the extension-retraction airbag, respectively.

In an embodiment, the additional airbag is provided between the head-end airbag and the tail-end airbag; and the additional airbag is evenly distributed around the extension-retraction airbag; or the additional airbag is provided on a tail portion of the tail-end airbag.

In an embodiment, the flexible peristaltic robot further comprises a pressure sensor, wherein the pressure sensor is provided on an outer side wall of the head-end airbag and an outer side wall of the tail-end airbag for detecting a pressure of the outer side wall of the head-end airbag and the tail-end airbag and an inner wall of an operation pipeline.

Compared to the prior art, this application has the following beneficial effects.

In this application, a flexible peristaltic robot is provided with a built-in bidirectional gas pump to supply or discharge gas without external air pipes and external gas pumps, which improves the flexibility of the robot.

BRIEF DESCRIPTION OF THE DRAWINGS

The drawings described here are intended to facilitate further understanding of the present disclosure. Obviously, the described embodiments are illustrative of the present disclosure and are not intended to limit the scope of the present disclosure.

DETAILED DESCRIPTION OF EMBODIMENTS

The present disclosure will be further described in detail with reference to the embodiments and the accompanying drawings, from which objectives, technical solutions and advantages of the present disclosure will be better understood. It should be understood that the embodiments are illustrative of the present disclosure, and are not intended to limit the scope of the present disclosure. The present disclosure can be implemented by those of ordinary skill in the art without some of these specific details. The following description of embodiments is merely intended to facilitate the understanding of the present disclosure.

As used herein, terms "include", "comprise" or variations thereof should be interpreted as a non-exclusive inclusion. Specifically, the process, method, article, or apparatus is not limited to the elements listed therein, and should not exclude other elements that are not explicitly listed or inherent elements of the process, method, article or apparatus. Unless specified, the elements defined by the sentence "include . . . " do not exclude the existence of other same elements in the process, method, article, or equipment.

Figure 1:
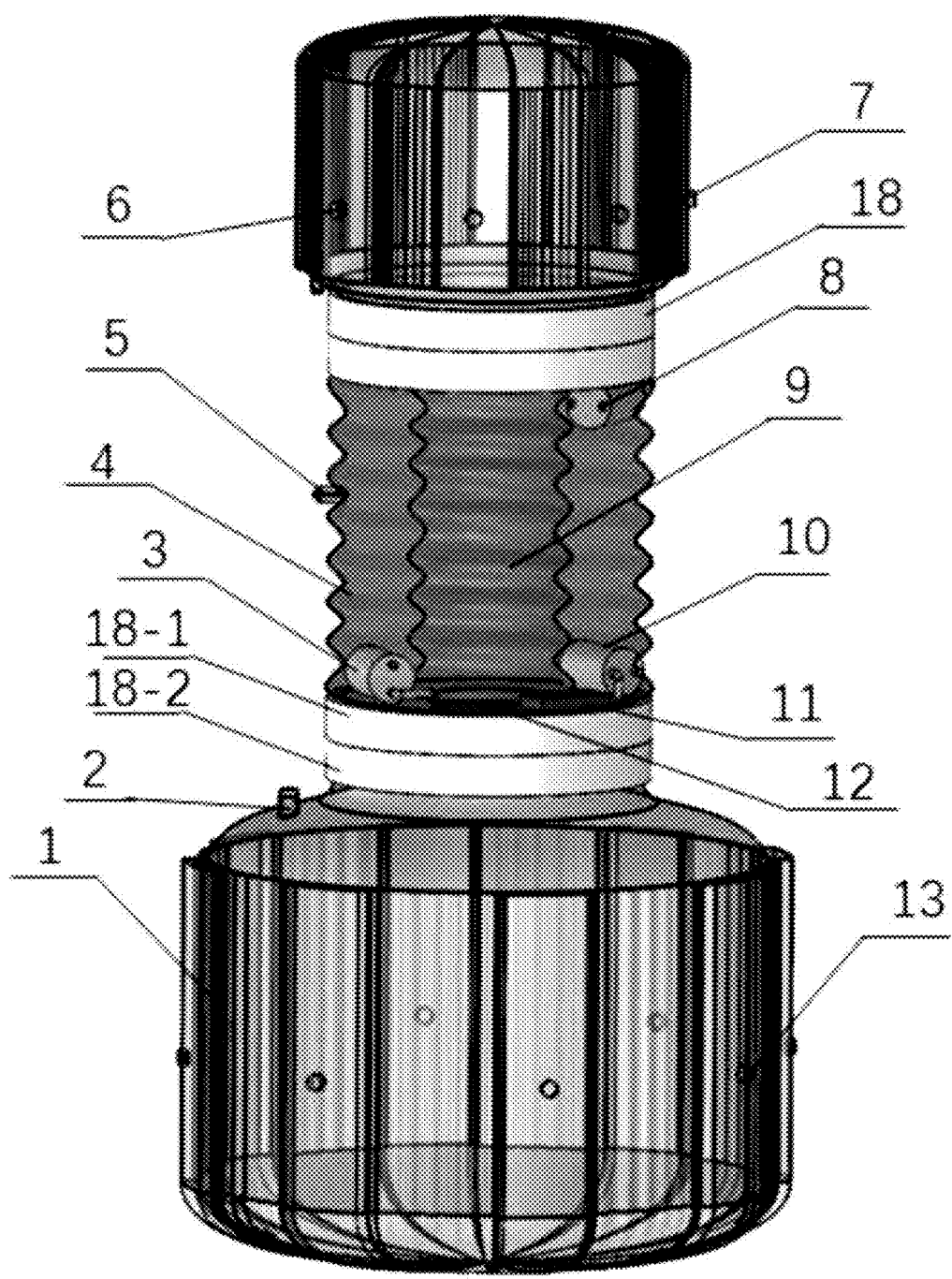
FIG. 1 is an overall structure diagram of a flexible peristaltic robot with a built-in bidirectional gas pump for self-regulating gas flow according to an embodiment of the present disclosure.

This embodiment provides a flexible peristaltic robot with a built-in bidirectional gas pump for self-regulating gas flow. FIG. 1 is an overall structure diagram of the flexible peristaltic robot with a built-in bidirectional gas pump for self-regulating gas flow according to an embodiment of the present disclosure. As shown in FIG. 1, the flexible peristaltic robot includes a head-end airbag 7, an extension-retraction airbag 9, a tail-end airbag 1, a power module 12, a control module 11 and a bidirectional gas pump. The bidirectional gas pump includes a first bidirectional gas pump 8, a second bidirectional gas pump 10 and a third bidirectional gas pump 3. The power module 12 is configured to supply power to the bidirectional gas pump and the control module 11. The head-end airbag 7, the extension-retraction airbag 9 and the tail-end airbag 1 are connected in sequence along an axial direction. The control module 11 is configured to control the first bidirectional gas pump 8 to inflate and deflate the head-end airbag 7, such that the head-end airbag 7 is expanded or contracted along a radial direction. The control module 11 is configured to control the second bidirectional gas pump 10 to inflate and deflate the tail-end airbag 1, such that the tail-end airbag 1 is expanded or contracted along the radial direction. The control module 11 is configured to control the third bidirectional gas pump 3 to inflate and deflate the extension-retraction airbag 9, such that the extension-retraction airbag 9 is extended or contracted along the axial direction.

The head-end airbag 7 and the tail-end airbag 1 both have an elastic, flexible and deformable body and adopt a redundancy design, such that the head-end airbag 7 and the tail-end airbag 1 can actively adapt to pipelines with different diameters and shapes after being inflated.

Through the above-mentioned structure, the head-end airbag 7, the tail-end airbag 1 and the extension-retraction airbag 9 are inflated and deflated in a certain order under the action of the bidirectional gas pump, which realizes the flexible peristalsis of the flexible peristaltic robot in the pipelines. The flexible peristaltic robot is provided with the built-in bidirectional gas pump to supply or discharge gas without external air pipes and external gas pumps, which solves a problem of low flexibility of an airbag-type peristaltic robot and improves the flexibility of the flexible peristaltic robot.

Figure 2:
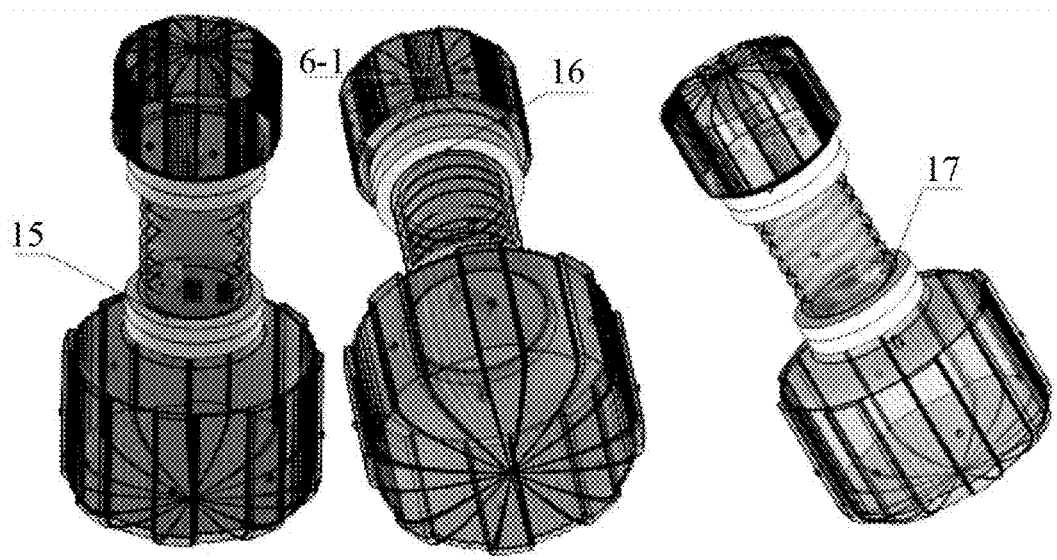
FIG. 2 is a structure diagram of the flexible peristaltic robot with a built-in bidirectional gas pump for self-regulating gas flow according to an embodiment of the present disclosure.

A structure of the flexible peristaltic robot provided herein is schematically presented in FIG. 2, where the robot includes the tail-end airbag 1, a first gas vent 15, the head-end airbag 7, a second gas vent 16, the extension-retraction airbag 9 and a third air vent 17. In an embodiment, the bidirectional gas pump directly introduces air from the external environment or discharges air into the external environment. That is, the gas in the tail-end airbag 1, the head-end airbag 7 and the extension-retraction airbag 9 is directly exchanged with external gas through the first gas vent 15, the second gas vent 16 and the third gas vent 17, respectively, without forming a gas circulation inside the robot. Such robot in which the gas is directly exchanged with the external gas can be applied to most pipelines.

Figure 3:
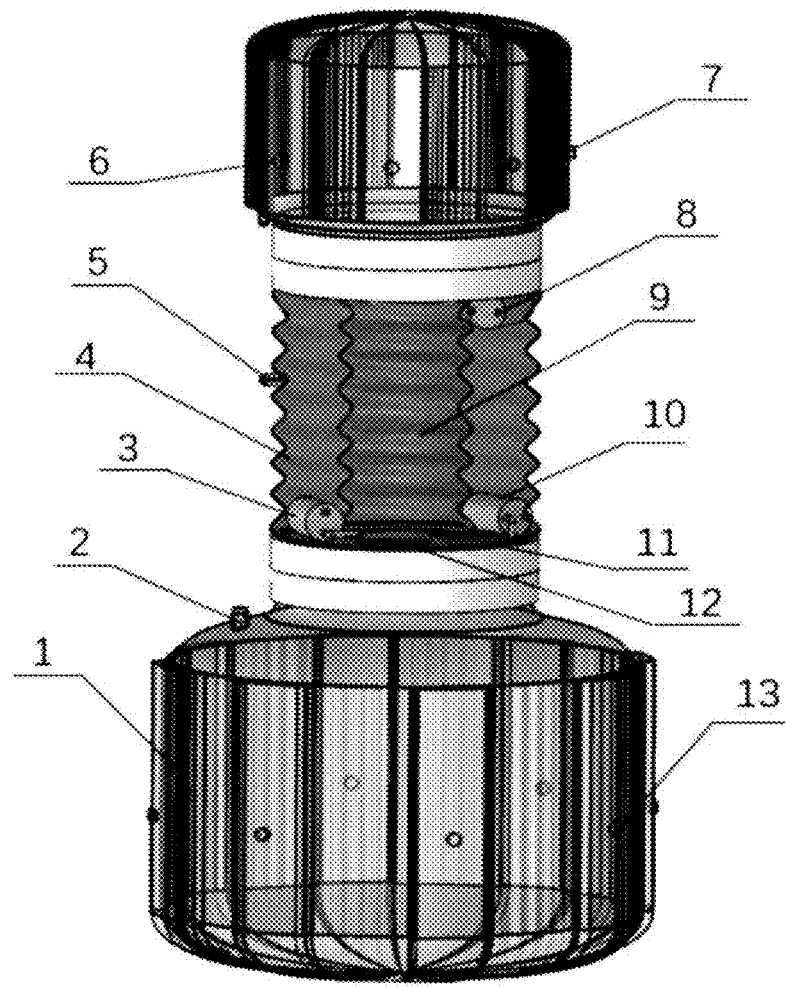
FIG. 3 is another structure diagram of the flexible peristaltic robot with a built-in bidirectional gas pump for self-regulating gas flow according to an embodiment of the present disclosure.

However, when the robot is applied to a more severe environment, such as gas-liquid mixing pipelines, corrosive air pipes, or various gastrovascular cavities, the direct collection of gas from the outside may introduce the corrosive gas or liquid to the airbag, thereby causing the robot to lose the ability to move and become scrapped. Therefore, in this embodiment, the robot does not need an external gas source, and gases supplied and discharged by the bidirectional gas pump flow inside the flexible peristaltic robot to solve the above problem. Referring to FIG. 3, the robot further includes an additional airbag 4, which is configured to store gas.

In an embodiment, the bidirectional gas pump includes the first bidirectional gas pump 8, the second bidirectional gas pump 10 and the third bidirectional gas pump 3. Two air pipes of the first bidirectional gas pump 8 are connected to the additional airbag 4 and the head-end airbag 7, respectively. Two air pipes of the second bidirectional gas pump 10 are connected to the additional airbag 4 and the tail-end airbag 1, respectively. Two air pipes of the third bidirectional gas pump 3 are connected to the additional airbag 4 and the extension-retraction airbag 9, respectively. Such connection manner makes the flexible peristaltic robot be a closed space. Except for the additional airbag 4, each of the airbags has the independent gas pump to connect to the additional airbag 4. Each of the gas pumps is configured to exchange gas between the corresponding airbag and the additional airbag 4.

The additional airbag 4 can be provided flexibly as long as it does not affect peristaltic advancement of the robot. In an embodiment, the additional airbag 4 is provided between the head-end airbag 7 and the tail-end airbag 1, and the additional airbag 4 is evenly distributed around the extension-retraction airbag 9. The additional airbag 4 can deform radially and axially as the extension-retraction airbag 9 is expanded and contracted. Such arrangement makes the additional airbag 4 avoid contact with the inner wall of the pipeline after being inflated, so as to avoid interference with the peristaltic advancement of the flexible peristaltic robot.

In an embodiment, the additional airbag 4 is provided on a tail portion of the tail-end airbag 1. As long as the additional airbag 4 does not cause a large pressure on the inner wall of the pipeline after being inflated, it will not interfere with peristaltic advancement of the robot.

In an embodiment, the robot further includes a mounting platform 18. The mounting platform 18 is provided at a connection between the head-end airbag 7 and the extension-retraction airbag 9 or at a connection between the tail-end airbag 1 and the extension-retraction airbag 9; or the connection between the head-end airbag and the extension-retraction airbag and the connection between the tail-end airbag and the extension-retraction airbag are provided with the mounting platform, respectively.

In an embodiment, the bidirectional gas pump, the power module 12 and the control module 11 are provided on the mounting platform 18. The mounting platform 18 is preferably made of materials with a certain strength and low density, such as plastic or aluminum alloy.

In an embodiment, the mounting platform 18 includes a first flange 18-1 and a second flange 18-2 matched with each other. The first flange 18-1 is connected sealedly with the second flange 18-2 in order to facilitate the disassembly of the head-end airbag 7, the extension-retraction airbag 9, and the tail-end airbag 1. The first flange 18-1 is connected to extension-retraction airbag 9, and the second flange 18-2 is connected to the head-end airbag 7 and/or the tail-end airbag 1. Preferably, the first flange 18-1 is connected to the second flange 18-2 by threads or locks.

In an embodiment, the flexible peristaltic robot further includes a head-end airbag pressure sensor 6 and a tail-end airbag pressure sensor 13. The head-end airbag pressure sensor 6 and the tail-end airbag pressure sensor 13 are provided on an outer side wall of the head-end airbag 7 and an outer side wall of the tail-end airbag 1, respectively, for detecting pressure of the outer side wall of the head-end airbag 7 and the tail-end airbag 1 and an inner wall of an operation pipeline. The control module 11 controls the working status of each of the bidirectional gas pumps according to the pressure values.

Described below is a working process of the flexible peristaltic robot (FIG. 3).

The tail-end airbag 1 is pre-inflated through a tail-end airbag valve 2, and the tail-end airbag 1 is supplemented gas during use through the tail-end airbag valve 2. The additional airbag 4 is pre-inflated through an additional airbag valve 5, and the additional airbag 4 is supplemented gas during use through the additional airbag valve 5. The extension-retraction airbag 9 is supplemented gas from the additional airbag 4 through the third bidirectional gas pump 3. The head-end airbag 7 is pre-inflated through a head-end airbag valve 6-1, and the head-end airbag 7 is supplemented gas during use through the head-end airbag valve 6-1. During the operation, each of the airbags exchanges gas with the additional airbag 4 through the corresponding bidirectional gas pump, enabling an internal circulation of air flow without connecting to an external air pipe. The bidirectional gas pump can pump gas from the additional airbag 4 to each of the airbags and can also pump gas from each of the airbags to the additional airbag 4. The bidirectional gas pump, the power module 12 and the control module 11 are provided on the mounting platform 18.

The working process of the robot is performed through the following steps.

It is supposed that the head-end airbag 7 and the tail-end airbag 1 are pre-inflated with 0.75 unit of gas, the extension-retraction airbag 9 is pre-inflated with 1 unit of gas and the additional airbag 4 is pre-inflated with 0.5 unit of gas. When the gas in the head-end airbag 7 and the tail-end airbag 1 reaches 1 unit, the head-end airbag 7 and the tail-end airbag 1 are in full contact with the inner wall of the pipeline and a feedback value measured by the pressure sensors reaches a set value. At this time, the respective airbag valves are closed, so that the airbags do not exchange the gas with the external environment, forming an independent quantitative internal circulation system. In practical applications, pre-inflated volume in each of the airbags is added according to actual needs.

(1) The first bidirectional gas pump 8 pumps gas out of the additional airbag 4 to inflate the head-end airbag 7 with 0.25 unit of gas. At this time, the head-end airbag 7 expands radially and is supported on the inner wall of the pipeline, and the pressure value of the head-end airbag pressure sensor 6 also reaches the set value.

(2) The third bidirectional gas pump 3 pumps gas out of the extension-retraction airbag 9 to inflate the additional airbag 4 with 0.8 unit of gas. At this time, the extension-retraction airbag 9 contracts axially to drive the tail-end airbag 1 to move along the axial direction. At the same time, the additional airbag 4 is squeezed in the axial direction and expanded in the radial direction in non-contact with a pipeline wall.

(3) The second bidirectional gas pump 10 pumps 0.25 unit of gas out of the additional airbag 4 to inflate the tail-end airbag 1. At this time, the tail-end airbag 1 expands radially and is supported on the inner wall of the pipeline, and the pressure value of the tail-end airbag pressure sensor 13 also reaches the set value.

(4) The first bidirectional gas pump 8 pumps 0.25 unit of gas out of the head-end airbag 7 to inflate the additional airbag 4. At this time, the head-end airbag 7 contracts radially and is detached from the inner wall of the pipeline.

(5) The third bidirectional gas pump 3 pumps 0.8 unit of gas out of the additional airbag 4 to inflate the extension-retraction airbag 9, so as to enable the extension-retraction airbag 9 to extend axially. At the same time, the additional airbag 4 contracts radially and extend axially, so that the extension-retraction airbag 9 drives the head-end airbag 7 to move forward along the axial direction.

Repeating the above steps, the robot can move forward in the pipeline by itself.

It should be noted that the sizes and inflation unit values of the airbags in the foregoing embodiments are exemplary, which can be designed according to actual application requirements. In addition, the flexible peristaltic robot is pre-inflated with a certain volume of the gas during use, where the volume of the gas is also determined according to the requirements. Therefore, the gas circulation is formed inside the robot without introduction of external gas, so as to render the robot suitable to be used in a hazardous gas environment.

An open-type peristaltic robot without the additional airbag 4 can be used in a normal environment. The working process of the open-type peristaltic robot is similar to that of the above-mentioned robot, and the difference is that the bidirectional gas pump inflates the airbag with the outside gas and pumps gas out of the airbag to the outside.

Figure 4:
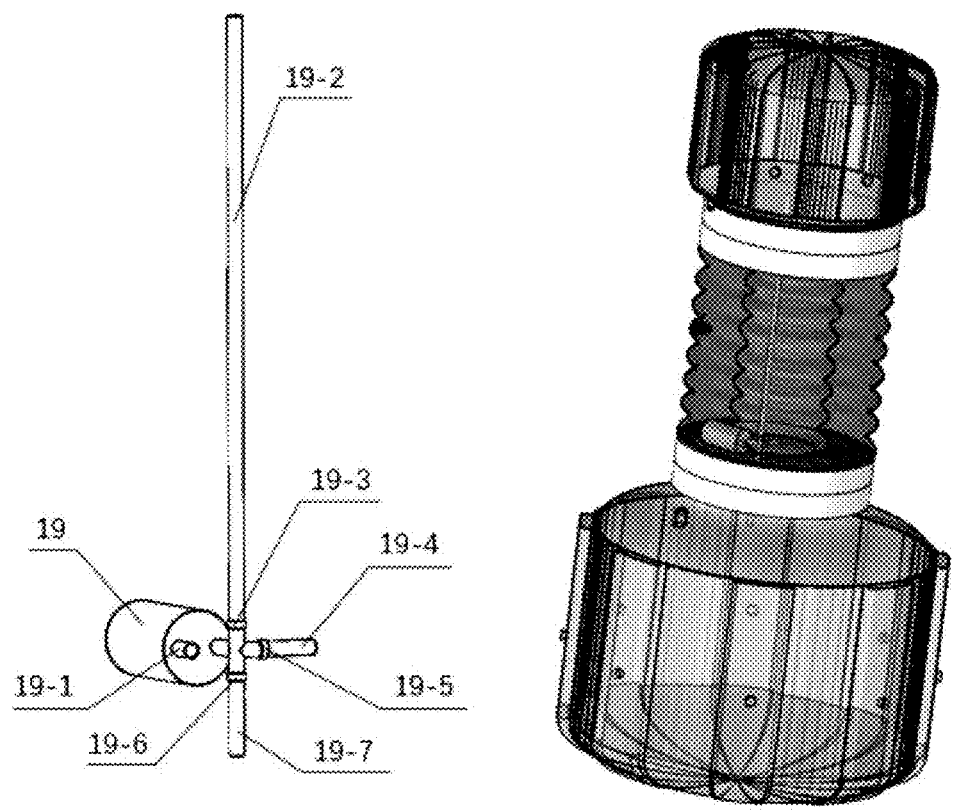
FIG. 4 is another structure diagram of the flexible peristaltic robot with a built-in bidirectional gas pump for self-regulating gas flow according to an embodiment of the present disclosure.

As shown in FIG. 4, in an embodiment, the number of the bidirectional gas pump 19 is one. The robot further includes a first channel 19-2, a second channel 19-4, a third channel 19-7, a first electrically-controlled switch 19-3, a second electrically-controlled switch 19-5 and a third electrically-controlled switch 19-6. The head-end airbag 7, the tail-end airbag 1 and the extension-retraction airbag 9 are connected to an air pipe of the bidirectional gas pump 19 through the channels respectively. Each of the channels is provided with the electrically-controlled switch. The additional airbag 4 is connected to the other air pipe of the bidirectional gas pump 19.

At this time, the working process of the peristaltic robot is performed through the following steps. The additional airbag 4 is pre-inflated with sufficient gas. The head-end airbag 7, the tail-end airbag 1 and the extension-retraction airbag 9 are all in a contracted state, and all electrically-controlled switches are in an off state.

(1) The third electrically-controlled switch 19-6 is switched on, and the second bidirectional gas pump 10 pumps gas from the additional airbag 4 to the tail-end airbag 1. At this time, the tail-end airbag 1 expands radially to enable the tail-end airbag 1 to fully contact with the inner wall of the pipeline and to be supported on the inner wall of the pipeline. After the pressure detected by the pressure sensor 13 on the outer wall of the tail-end airbag reaches the set value, the third electrically-controlled switch 19-6 is switched off.

(2) The second electrically-controlled switch 19-5 is switched on, and the third bidirectional gas pump 3 pumps gas from the additional airbag 4 into the extension-retraction airbag 9, so as to enable the extension-retraction airbag 9 to extend axially and the head-end airbag 7 of the robot to move forward. After the predetermined extension is reached, the second electrically-controlled switch 19-5 is switched off.

(3) The first electrically-controlled switch 19-3 is switched on, and the first bidirectional gas pump 8 pumps gas out of the additional airbag 4 to inflate the head-end airbag 7. At this time, the head-end airbag 7 expands radially to enable the head-end airbag 7 to fully contact with the inner wall of the pipeline and to be supported on the inner wall of the pipeline. After the pressure value of the head-end airbag pressure sensor 6 also reaches the set value, the first electrically-controlled switch 19-3 is closed.

(4) After the third electrically-controlled switch 19-6 is opened, the second bidirectional gas pump 10 pumps gas out of the tail-end airbag 1 to inflate the additional airbag 4, so that the tail-end airbag 1 is detached from the inner wall of the pipeline. At this time, the third electrically-controlled switch 19-6 is closed.

(5) After the second electrically-controlled switch 19-5 is opened, the third bidirectional gas pump 3 pumps gas out of the extension-retraction airbag 9 to inflate the additional airbag 4. At this time, the extension-retraction airbag 9 contracts axially to drive the tail-end airbag 1 of the robot to move along the axial direction. After the predetermined contraction value is reached, the second electrically-controlled switch 19-5 is closed.

Repeating the above steps, the flexible peristaltic robot can move forward in the pipeline.

Figure 5:
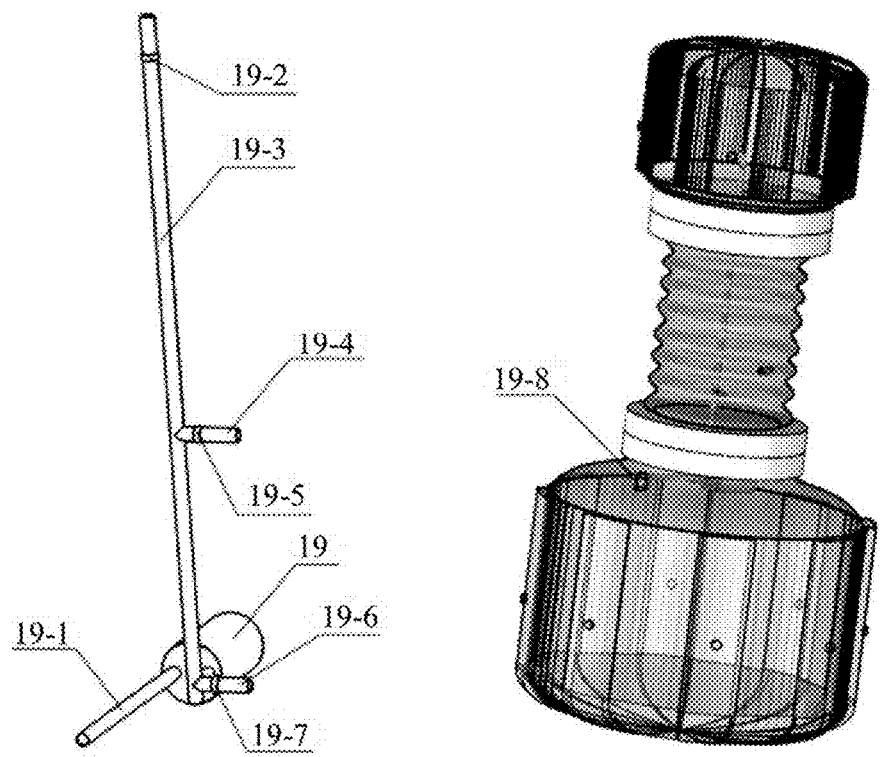
FIG. 5 is another structure diagram of the flexible peristaltic robot with a built-in bidirectional gas pump for self-regulating gas flow according to an embodiment of the present disclosure.

In an embodiment, the bidirectional gas pump 19 of the above-mentioned robot directly collects gas from the external environment or discharges the gas into the external environment. FIG. 5 shows a flexible peristaltic robot with a shared air pump without the additional airbag 4. The bidirectional gas pump 19 is provided on a baseplate of the tail-end airbag 1. A fourth channel 20-1 penetrates the tail-end airbag 1 to communicate with the outside gas through an air gate 20-8. A fifth channel 20-3 communicates with the head-end airbag 7, and a fourth electrically-controlled switch 20-2 controls on-off of the fifth channel 20-3. A sixth channel 20-4 communicates with the extension-retraction airbag 9, and a fifth electrically-controlled switch 20-5 controls on-off of the sixth channel 20-4. A seventh channel 20-6 communicates with the tail-end airbag 1, and the sixth electrically-controlled switch 20-7 controls on-off of the seventh channel 20-6.

The working process of the robot is similar to that of a robot with a shared air pump and the additional airbag 4, and the difference is that the gas pump is to inflate the airbag with outside gas rather than gas from the additional airbag 4.

Figure 6:
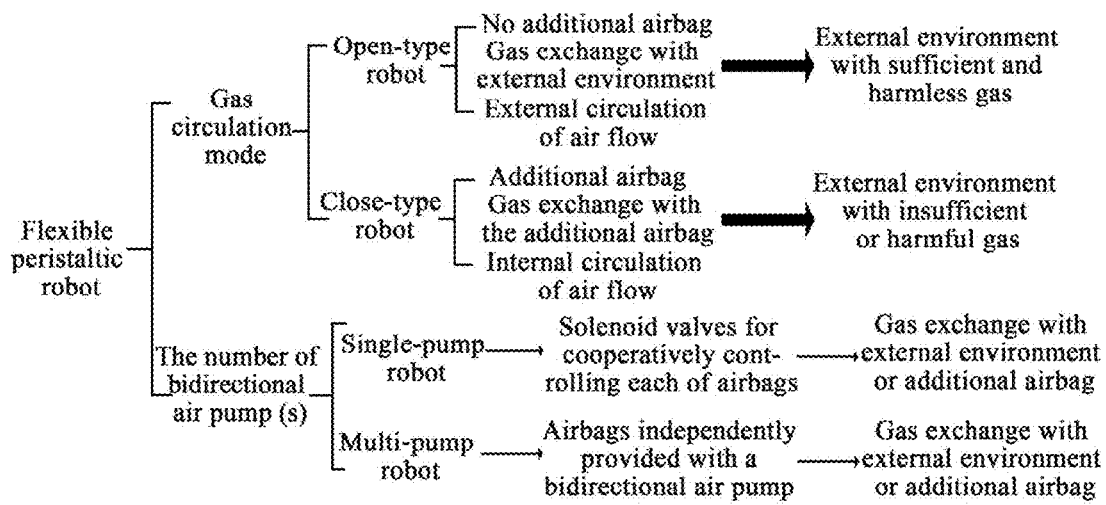
FIG. 6 schematically shows classification of the flexible peristaltic robot with a built-in bidirectional gas pump for self-regulating gas flow according to an embodiment of the present disclosure based on structure.

The classification of the flexible peristaltic robot based on structure is schematically presented in FIG. 6. As shown in FIG. 6, the robot provided herein is divided into an open-type flexible peristaltic robot and a closed-type flexible peristaltic robot according to a gas circulation mode.

(1) The open-type flexible peristaltic robot is free of the additional airbag 4. The tail-end airbag 1, the head-end airbag 7 and the extension-retraction airbag 9 exchange gas with the external environment through the bidirectional gas pump to form an external circulation of gas flow. The open-type flexible peristaltic robot is applied in the external environment with sufficient and harmless gas.

(2) The closed-type flexible peristaltic robot has the additional airbag 4, and each of the airbags is pre-inflated with a certain amount of gas according to the requirements. During use, the tail-end airbag 1, the head-end airbag 7 and the extension-retraction airbag 9 exchange gas with the additional airbag 4 to form an internal circulation of the gas flow without gas exchange with the external environment. The closed-type flexible peristaltic robot is applied in the external environment with harmful gas or less gas.

The flexible peristaltic robot is divided into a single-pump flexible peristaltic robot and a multiple-pump flexible peristaltic robot according to the number of the bidirectional air pump.

(1) In the flexible peristaltic robot with the single bidirectional gas pump, the single bidirectional gas pump works in conjunction with multiple electrically-controlled switches. Each of the airbags can be controlled to exchange gas with the external environment or additional airbag 4 by sequentially controlling the on-off of each of the electrically-controlled switches, such that the expansion and contraction of each of the airbags are controlled to allow the robot to move.

(2) In the flexible peristaltic robot with the multiple bidirectional air pumps, the head-end airbag 7, the extension-retraction airbag 9 and the ail-end airbag 1 all have independent bidirectional air pumps. A control system sequentially controls the on-off and direction of the respective air pumps to control each of the airbags to exchange gas with the external environment or additional airbag 4, such that the expansion and contraction of each of the airbags are controlled to allow the robot to move.

Therefore, a flexible peristaltic robot with a built-in bidirectional gas pump for self-regulating gas flow provided by this embodiment is divided into four structures, which are an open-type single-pump flexible peristaltic robot, an open-type multiple-pump flexible peristaltic robot, a closed-type single-pump flexible peristaltic robot and a closed-type multiple-pump flexible peristaltic robot, respectively. In practical applications, a suitable structure can be selected according to the requirements.

In addition to the gas, the flexible peristaltic robot can also use magnetism, electricity, heat, sound, biological materials and chemical materials as power sources. In the practical applications, the robot can be used as a carrying platform to transport a target object to a target site according to the actual requirements. For example, the robot can carry an optical fiber for laser surgery.

Described above are only preferred embodiments of this application, and are not intended to limit this application. Any modification, equivalent replacement and improvement made by those skilled in the art without departing from the spirit of this application shall fall within the scope of this application.

What is claimed is:

1. A flexible peristaltic robot with a built-in bidirectional gas pump for self-regulating gas flow, comprising:
   a head-end airbag;
   a extension-retraction airbag;
   a tail-end airbag;
   a power module;
   a control module;
   a bidirectional gas pump; and
   an additional airbag;
   wherein the power module is configured to supply power to the bidirectional gas pump and the control module;
   the head-end airbag, the extension-retraction airbag and the tail-end airbag are connected in sequence along an axial direction;
   the control module is configured to control the bidirectional gas pump to inflate and deflate the head-end airbag, the extension-retraction airbag and the tail-end airbag, such that the head-end airbag and the tail-end airbag are expanded or contracted along a radial direction, and the extension-retraction airbag is extended or retracted along the axial direction;
   the additional airbag is configured to store gas;
   the bidirectional gas pump comprises a first bidirectional gas pump, a second bidirectional gas pump and a third bidirectional gas pump; and
   two air pipes of the first bidirectional gas pump are connected to the additional airbag and the head-end airbag, respectively; two air pipes of the second bidirectional gas pump are connected to the additional airbag and the tail-end airbag, respectively; and two air pipes of the third bidirectional gas pump are connected to the additional airbag and the extension-retraction airbag, respectively.

2. The flexible peristaltic robot of claim 1, wherein the flexible peristaltic robot does not need an external gas source, and gases fed and discharged by the bidirectional gas pump flow inside the flexible peristaltic robot.

3. The flexible peristaltic robot of claim 1, further comprising a mounting platform;
   wherein the mounting platform is provided at a connection between the head-end airbag and the extension-retraction airbag or at a connection between the tail-end airbag and the extension-retraction airbag; or the connection between the head-end airbag and the extension-retraction airbag and the connection between the tail-end airbag and the extension-retraction airbag are provided with the mounting platform, respectively.

4. The flexible peristaltic robot of claim 3, wherein the bidirectional gas pump, the power module and the control module are provided on the mounting platform.

5. The flexible peristaltic robot of claim 3, wherein the mounting platform comprises a first flange and a second flange matched with each other; the first flange is connected sealedly with the second flange; and the first flange is connected to the extension-retraction airbag, and the second flange is connected to the head-end airbag and/or the tail-end airbag.

6. The flexible peristaltic robot of claim 1, wherein the additional airbag is provided between the head-end airbag and the tail-end airbag; and the additional airbag is evenly distributed around the extension-retraction airbag; or the additional airbag is provided on a tail portion of the tail-end airbag.

7. The flexible peristaltic robot of claim 1, further comprising:
   a first pressure sensor; and
   a second pressure sensor;
   wherein the first pressure sensor is provided on an outer side wall of the head-end airbag, and the second pressure sensor is provided on an outer side wall of the tail-end airbag.

* * * * *